United States Patent [19]

Krause et al.

[11] Patent Number: 5,626,287
[45] Date of Patent: May 6, 1997

[54] SYSTEM AND METHOD FOR CONTROLLING A WATER HEATER

[75] Inventors: Timothy D. Krause, Cypress, Calif.; Leo J. Weeks, Las Vegas, Nev.

[73] Assignee: TDK Limited, Cypress, Calif.

[21] Appl. No.: 476,319

[22] Filed: Jun. 7, 1995

[51] Int. Cl.⁶ .............................. F24H 1/00; F23N 1/08
[52] U.S. Cl. .................... 236/20 R; 126/362; 392/463
[58] Field of Search .................... 236/20 R; 126/362, 126/374; 237/8 R; 219/330

[56] References Cited

U.S. PATENT DOCUMENTS

| | | | |
|---|---|---|---|
| 4,016,402 | 4/1977 | Scott | 219/334 |
| 4,090,663 | 5/1978 | Bonne et al. | 236/10 |
| 4,166,944 | 9/1979 | Scott | 126/362 X |
| 4,413,775 | 11/1983 | Scott | 236/20 R |
| 4,449,178 | 5/1984 | Blau, Jr. et al. | 219/492 X |
| 4,508,261 | 4/1985 | Blank | 236/20 R |
| 4,522,333 | 6/1985 | Blau, Jr. et al. | 236/20 R |
| 4,535,931 | 8/1985 | Bartok et al. | 236/20 R |
| 4,620,667 | 11/1986 | Vandermeyden et al. | 126/351 X |
| 4,759,497 | 7/1988 | Cook | 236/20 R |
| 4,832,259 | 5/1989 | Vandermeyden | 126/362 X |
| 4,834,284 | 5/1989 | Vandermeyden | 126/374 X |
| 5,056,712 | 10/1991 | Enca | 236/20 R |

FOREIGN PATENT DOCUMENTS

| | | |
|---|---|---|
| 2358754 | 11/1973 | Germany . |
| 58-129515 | 8/1983 | Japan . |

Primary Examiner—William E. Wayner
Attorney, Agent, or Firm—Darby & Darby, P.C.

[57] ABSTRACT

A system for controlling a water heating system senses the temperature of new (unheated) water and uses any drop in that temperature as an early, quantitative measure of the demand for hot water within the system. The heater itself is turned "on" and "off" with respect to a control set point temperature ($T_C$) which increases with decreasing inlet water temperature. Thus, the control set point is increased above a baseline by an amount related to the amount of unheated water drawn into the heater to replenish the heated water being used. In a preferred embodiment, a calculated demand value proportional to the drop in inlet water temperature ($T_I$) is summed over time to reflect the time during which a given demand condition continues. When the heater is ultimately turned "off", signifying that the hot water supply temperature ($T_S$) is substantially higher than the control temperature ($T_C$), the control temperature is reset to its baseline value.

18 Claims, 6 Drawing Sheets

SYSTEM AND METHOD FOR CONTROLLING A WATER HEATER

BACKGROUND OF THE INVENTION

The present invention relates generally to an apparatus and a method for controlling a water heater system and, more particularly, to a system for quantitatively controlling a water heater in accordance with a measured demand for hot water.

Any system for providing hot water in a building must be capable of providing sufficient hot water to supply the needs of the building's occupants. Traditionally, this has been accomplished using an internal thermostatic control, or "aquastat", to control the temperature of the heated water to a fixed set point high enough to meet the demand for hot water during peak periods, such as early morning and late evening hours. This practice results in substantial loss of heat by conduction and convection during non-peak periods, however, and is particularly inefficient in large recirculating hot water systems. It is therefore desirable to reduce the set point temperature of a hot water system during off-peak periods to conserve energy.

A number of supplemental control systems have been proposed for altering the operation of large, recirculating water heating systems during off-peak periods as a way of conserving energy. One such system uses a time clock to switch from a relatively high control temperature during peak use periods to a lower control temperature at off-peak periods. Other systems make use of historical data to control water heaters, as described in U.S. Pat. Nos. 4,620,667 and 4,834,284, both to Vandermeyden, and U.S. Pat. No. 5,056,712 to Enck. The systems of the Vandermeyden patents are typically operated in series with the aquastat of an associated water heater. They develop a separate control temperature based on historical usage data representing the proportion of time during a preceding period that the water heater's burner was "on". Such systems lag significantly behind the actual demand for heated water, however.

The system of the Enck patent senses hot water usage by monitoring the temperature of "cold" water in the system's water supply inlet at a point adjacent a hot water storage tank. The water within this "migration zone" is heated somewhat by the storage tank itself and thus reaches an intermediate temperature after a period of low hot water usage. The intermediate temperature is suddenly lowered, however, when additional water is introduced to replenish hot water depleted by consumers, providing an early indication of hot water use. This information is then used to determine an appropriate set back temperature range, depending on whether the system is within "an historically indicated hot water use period." The Enck system therefore uses inlet water temperature in a qualitative sense to select an operating temperature range based on historical information. Unfortunately, the use of historical information complicates the system and renders it less responsive to current usage demands.

Therefore, it is desirable in many applications to provide a system for controlling the operation of a hot water heater which is highly efficient, responsive and simple in its implementation.

SUMMARY OF THE INVENTION

The system and method of the present invention control the operation of a water heater as a function of demand, as sensed by a measured drop in the temperature of new (unheated) water entering the system at a location near the juncture of an inlet water conduit and the water heater itself. The magnitude of this drop in temperature provides an early, quantitative measure of the actual demand for hot water. It results from the displacement of water which has been warmed by migration of heat from the hot water within the heating system. The inlet water temperature at a location near the heater is therefore high during periods of extended non-use, but cools rapidly as cold water flows through the inlet pipe to replenish hot water used within the system. The magnitude of the temperature drop and the time over which it persists are directly related to the amount of hot water used, providing information sufficient to determine the control temperature at which the system should be operated to meet demand at a given instant. The invention therefore provides a quantitative level of control temperature which can be updated over time to meet the demand for hot water. The input temperature which drives the control system returns to normal rapidly when usage subsides, causing the system to conserve energy by returning to its minimum temperature value. This significantly increases the efficiency of the system by causing it to operate at a low control temperature when demand is low but allowing it to react quickly and proportionately to increased usage.

Accordingly, the system and method of the present invention control a water heating system by: measuring an outlet temperature of water heated by the system and measuring an outlet temperature signal representative thereof; measuring an inlet temperature of unheated water introduced through an inlet orifice to replenish heated water supplied to users and generating an inlet temperature signal representative thereof, the inlet temperature being measured at a location adjacent the inlet orifice such that the inlet temperature drops when unheated water is introduced; deriving, in response to the measured inlet temperature signal, a control temperature value representative of the amount by which the inlet temperature drops; and controlling the heater in response to the outlet temperature signal to maintain a preselected relationship between the outlet temperature and the control temperature value. In a preferred embodiment, the control temperature is derived by measuring the difference between a reference temperature value encountered when unheated water has not been introduced for a specific period of time, and a dynamic, reduced temperature value encountered when unheated water has been introduced. In a further embodiment, the inlet temperature is sensed at a distance from the inlet orifice which is no more than three times the diameter of that orifice, and the temperature difference is sampled periodically and summed over time to derive the control temperature value. The heater may also be selectively activated and deactivated to maintain the preselected relationship between the outlet temperature and the control temperature value, and the control temperature value may be reset to a preselected minimum value when the heater is deactivated.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF CERTAIN PREFERRED EMBODIMENTS

Figure 1:
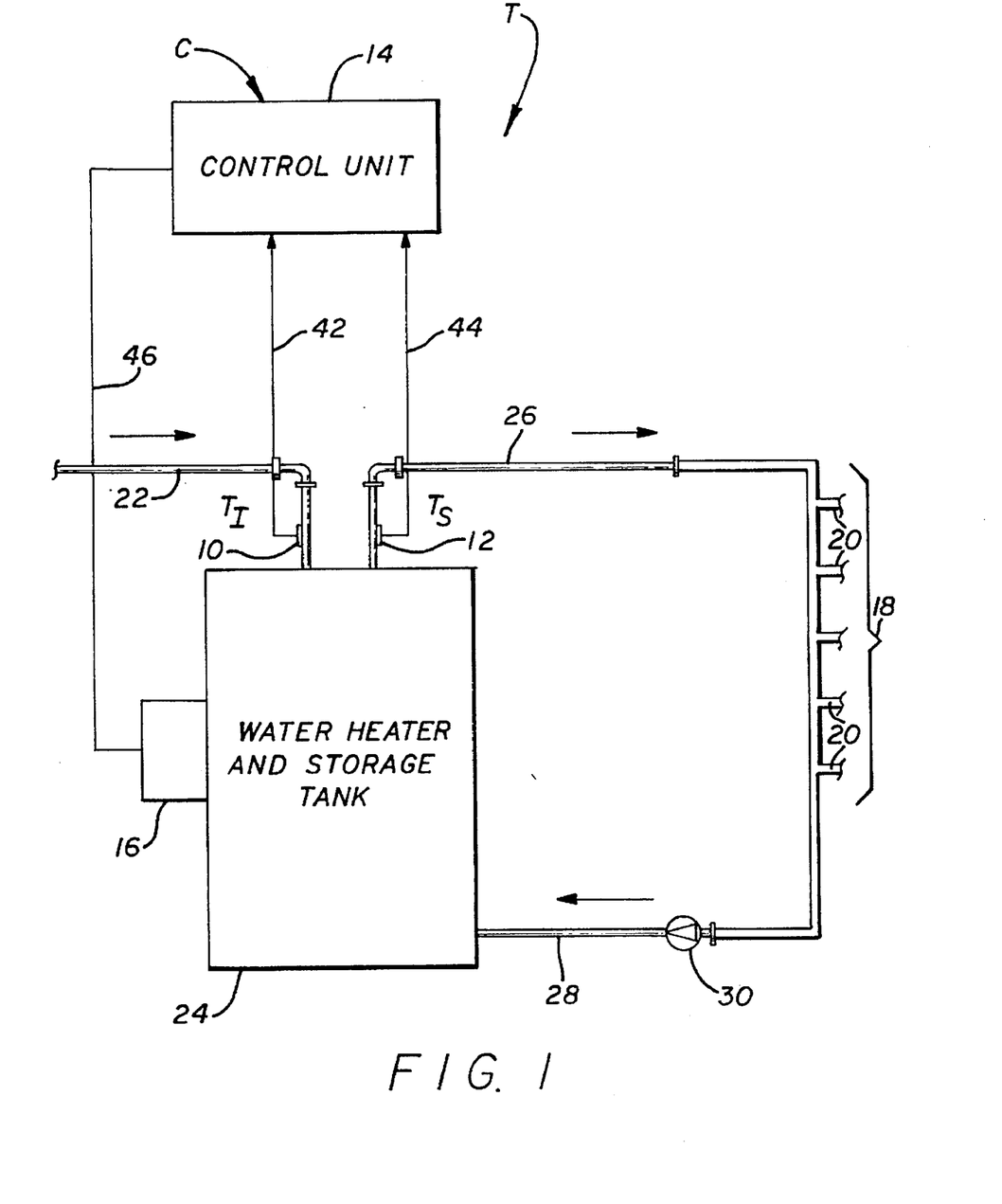
FIG. 1 is a simplified schematic representation of a tank-type hot water heating system in conjunction with a control unit constructed according to one embodiment of the present invention.
Figure 2:
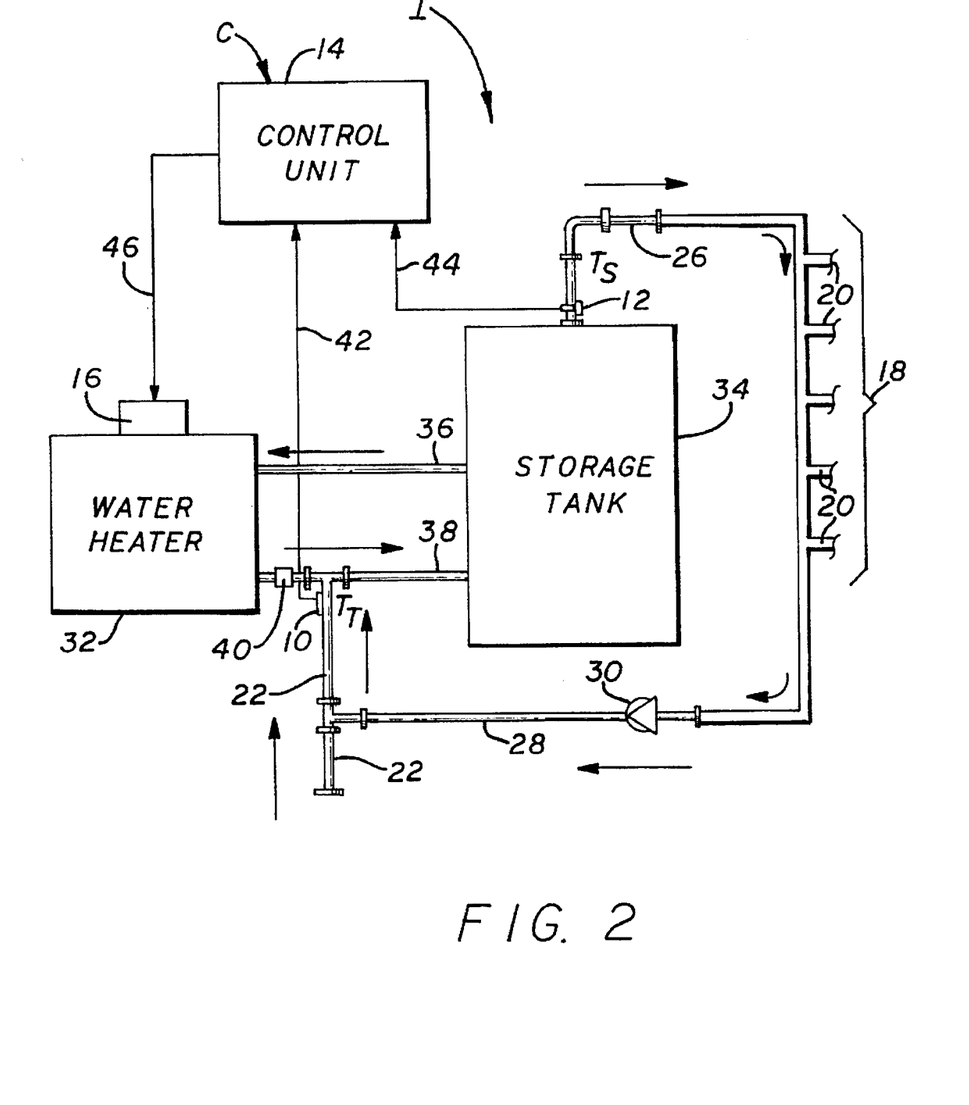
FIG. 2 is a simplified schematic representation of an instantaneous hot water heating system in conjunction with a control unit constructed according to another embodiment of the present invention.

Referring now to the drawings, specifically FIGS. 1 and 2, a control system C constructed in accordance with one embodiment of the present invention controls a tank-type water heating system T (FIG. 1) or an instantaneous water heating system I (FIG. 2) in accordance with input derived from an inlet temperature sensor 10 and a supply temperature sensor 12. The control system C has a control unit 14 which processes information from the sensors 10 and 12 to control the water heating system T or I in series with a conventional aquastat 16. The aquastat 16 is typically preset to maintain the output water at a relatively high level, such as 140 degrees, with the control system C acting in series with the aquastat to lower the effective control temperature during periods of low hot water usage.

The control unit 14 senses demand by monitoring the temperature of inlet water ($T_I$) entering the water heating system T or I due to the use of hot water by consumers within a hot water consumption circuit 18 having a plurality of separate branches 20. This is done by deriving a control temperature value ($T_C$) representative of the drop in inlet temperature ($T_I$) which effectively supersedes the higher control temperature of the aquastat 16. During periods of low hot water usage, the measured inlet temperature ($T_I$) rises significantly due to the migration of heat from the water heater T or I. Under these circumstances, the control unit 14 controls the water within the system to a minimum temperature value preprogrammed into the system. This value can be as low as 100 degrees, but typically is on the order of 118 degrees Fahrenheit. When hot water is used by the system, it is replenished by new (unheated) water flowing to the heater along an inlet conduit 22. This cooler water displaces that previously heated by migration and significantly reduces the temperature ($T_I$) sensed by the inlet temperature sensor 10. Under conditions of extremely high usage, the temperature $T_I$ can be reduced to 74 degrees or less, providing a measured temperature drop as high as approximately 44 degrees Fahrenheit.

In a preferred embodiment, the control unit 14 arrives at its control temperature ($T_C$) by computing a running sum based on the extent of the drop in the inlet temperature ($T_I$) over time. Thus, the control temperature ($T_C$) is increased to a level representing both the quantitative drop in inlet temperature ($T_I$) and the time over which that drop persists. Both of these quantities are indicative of the amount of hot water used by consumers and they occur at the time of the use. They do not "lag" behind the demand for hot water as do the supply temperature ($T_S$) and other parameters of the water heating system.

Figure 4:
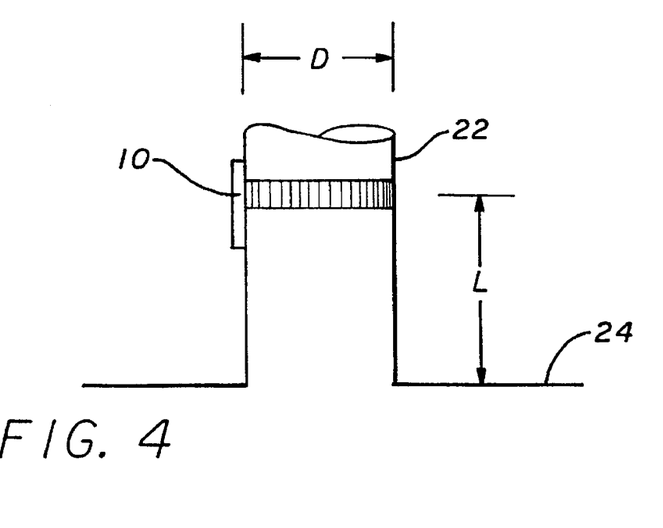
FIG. 4 is an enlarged fragmentary view of the inlet water temperature sensor of the system of FIG. 1, showing its position relative to the inlet conduit and the water heater itself.

The location of the inlet temperature sensor 10 on the inlet conduit 22 is important to provide a reliable and readily measurable temperature drop for control purposes. Although the exact placement can vary significantly between installations, the distance L between the sensor 10 and the juncture at which the inlet conduit enters the hot water region of the heating system T or I is preferably no more than approximately three times the diameter, D, of the inlet conduit. This is illustrated schematically in FIG. 4, which is an enlargement of the point at which the inlet conduit 22 enters a water heater and storage tank 24 of the heating system T. In one specific embodiment, the distance L is approximately twice the diameter, D.

Referring now more specifically to FIG. 1, water heated by the water heater and storage tank 24 is circulated through the hot water consumption circuit 18 by way of an outlet conduit 26 and a return conduit 28 under the influence of a recirculation pump 30. Although it is not essential that the water heating system be of the recirculating type, most large installations, such as hotels or apartment buildings, are. The instantaneous water heating system I is also illustrated as a recirculating system, but has an instantaneous wetter heater 32 and a separate storage tank 34 connected by a pair of conduits 36 and 38. The inlet conduit 22 then terminates into the conduit 38, with the inlet temperature sensor 10 being near the juncture of the two conduits. A check valve 40 within the conduit 38 eliminates the flow of unheated water back into the instantaneous water heater 32, causing it to flow first to the storage tank 34 as indicated by arrows in FIG. 2. Heated water from the storage tank 34 then circulates through the hot water consumption circuit 18 through an outlet conduit 26 and a return conduit 28 which are similar to the corresponding elements of the water heating system T of FIG. 1. This occurs under the influence of a recirculation pump 30, with the return water either entering the inlet conduit 22 at a location upstream of the inlet temperature sensor 10, as illustrated in FIG. 2, or entering the conduit 38 at a point downstream of the inlet conduit (not shown). In each case, the inlet water temperature ($T_I$) detected by the inlet temperature sensor 10 drops significantly during periods of heavy use, permitting the control temperature ($T_C$) to be adjusted to meet the demand. This adjustment process is accomplished by the control unit 14, which receives data from the inlet temperature sensor 10 and the supply temperature sensor 12 through sensor input lines 42 and 44, respectively, and controls the aquastat 16 through a control line 46.

Figure 3:
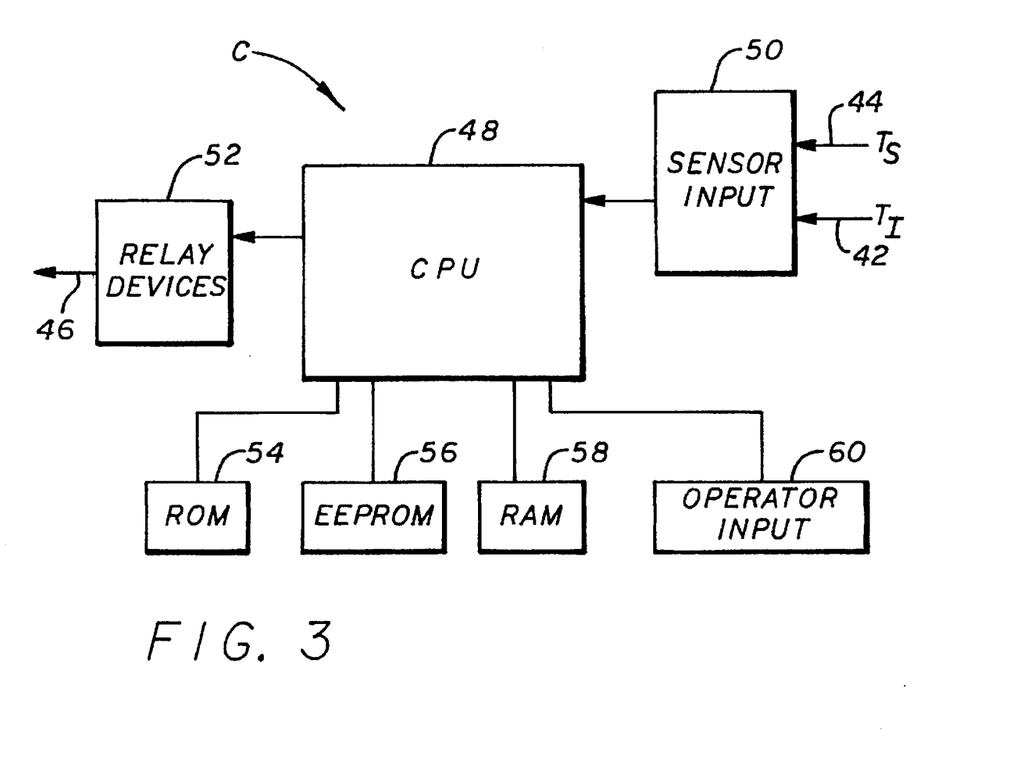
FIG. 3 is a simplified block diagram of a control unit constructed in accordance with an embodiment of the present invention.

The structure of the control unit C is illustrated in more detail in FIG. 3, wherein a central processing unit (CPU) 48 has a sensor interface 50 for receiving input from the sensor lines 42 and 44, and has a set of relay drivers 52 for communicating with the aquastat 16 (FIGS. 1 and 2) and any other appropriate relays of the water heating system. Control and operational data are maintained in suitable memory elements, including a read only memory (ROM) 54, an electronically erasable programmable read only memory (EEPROM) 56 and a random access memory (RAM) 58. Initial loading or subsequent alteration of operational data is accomplished through an operator interface 60 which may include a conventional computer display terminal (CDT) and graphical display hardware (not shown).

In one significant embodiment, the control unit C operates within the context of a preset maximum temperature ($T_{Max}$), a preset minimum temperature ($T_{Min}$) and preset dead band ($\Delta T_D$), which is the maximum temperature differential permitted between the hot water supply temperature ($T_S$) and the control temperature ($T_C$) before the burner of the heating system is switched between its "on" and "off" states. Because the control unit C is in series with the aquastat 16 of the water heating system, and because its operating temperature range ($T_{Min}$ to $T_{Max}$) is normally below the preset control temperature of the aquastat, the control unit C supersedes the operation of the aquastat whenever it is activated. Thus, energy is conserved during periods of hot water non-use only when the control unit C is "on". When the control unit C is deactivated, it presents a closed electrical circuit and permits the aquastat alone to control the water heating system.

The control unit C derives its control temperature ($T_C$) according to the expression $$T_C = T_{Min} + \text{DEMAND}, \tag{1}$$

where $T_C$ is the value used by the control unit C to turn the burner of the water heater "on" and "off", $T_{Min}$ is the preset minimum or "desired" water temperature during non-use periods, and DEMAND is the demand calculated by the control unit C based on the inlet temperature ($T_I$) over time. Because $$\text{DEMAND} = \text{USAGE} + \text{LOSS} - \text{HEATING}, \tag{2}$$

equation (1) becomes $$T_C = T_{Min} + \text{USAGE} + \text{LOSS} - \text{HEATING} \tag{3}$$

In equation (3), USAGE is a calculated quantity based on the reduction in inlet temperature ($T_I$) over time, LOSS is the amount of heat lost to the surroundings by conduction, convection and radiation, and HEATING is the contribution of the burners of the water heater during the time they are operating. Thus, the control temperature ($T_C$) is increased above the minimum temperature ($T_{Min}$) by amounts represented by USAGE and LOSS, but is decreased by the HEATING contribution of the burners.

USAGE, which is a measure of the hot water demand over the period since the burners were last turned "off", is expressed as $$\text{USAGE} \equiv \int_{t_0}^{t} R \cdot (T_R - T_I) dt, \tag{4}$$

where $T_R$ is a reference temperature representing the time average of the inlet temperature ($T_I$) over a twenty-four hour period. This value of $T_R$ is updated each twenty minutes by averaging the prior value in system memory with the highest value encountered in the current twenty minute period. This provides a "sliding window" of information, weighted substantially toward the most recent hour, with which to compare each instantaneous value of inlet temperature ($T_I$). Thus, the reference temperature ($T_R$) is automatically updated to account for diurnal and seasonal changes in the temperature of incoming water. As for the other variables of equation (4), $t_0$ is the time of the most recent prior updating of the control temperature value ($T_C$), t is the current time, and R is a calibration factor set by the operator based on experience to determine how responsive the system is to changes in inlet temperature ($T_I$).

The variable LOSS is essentially the integral of insulation loss over time, which is expressed as $$\text{LOSS} \equiv B \int_{t_0}^{t} dT/dt, \tag{5}$$

where T is the average temperature in the system and B is a constant.

Finally, the term HEATING is defined by the expression $$\text{HEATING} \equiv C \int_{t_0}^{t} H \cdot dT/dt, \tag{6}$$

where C is a constant and H is a binary variable indicating heater status. That is, H has a value of "0" when the burner of the water heater is "off" and a value of "1" when the burner is "on".

Substituting these quantities, the control temperature ($T_C$) is $$T_c = T_{Min} + \int_{t_0}^{t} R \cdot (T_R - T_I) dt + B \int_{t_0}^{t} dT/dt - \tag{7}$$

$$C \int_{t_0}^{t} H \cdot dT/dt.$$

As a practical matter, heat is lost through the insulation of the system at a substantially constant rate, and heat is added to the system by the burners at a second rate which is also substantially constant whenever the burners are "on". Thus, the latter two terms of equation (7) can be expressed as a constant rate of loss/gain and can be determined empirically. Thus, in one specific embodiment, LOSS has a value of 2.1 degrees Fahrenheit per hour and the term HEATING has a value of 12.0 degrees Fahrenheit per minute. In this situation, the factor R may have a value of 3.0 per minute and the equation (7) reduces to $$T_c = T_{Min} + \int_{t_0}^{t} (3.0)(T_R - T_I) dt + \frac{(2.1)}{60} (t - t_0) - (12.0)(t - t_0). \tag{8}$$

The USAGE term is the only term in equation (7) which must be calculated from sensor data. In a preferred embodiment, the calculation is repeated frequently, typically once every five seconds, with the USAGE, LOSS and HEATING values being added or subtracted, as appropriate, at the time of each recalculation. Thus, the control temperature ($T_C$) increases in proportion to the input temperature drop ($T_R - T_I$) as long as an input temperature drop continues to exist, and is further increased by the contribution of LOSS and decreased by the contribution of HEATING when the burners are "on".

In practice, the integration depicted in equation (8) is actually accomplished by a summation according to the formula $$\text{USAGE} \equiv \sum_{t_0}^{t} R \cdot (T_r - T_I) dt \tag{9}$$

As a rule of thumb, when R is set at 3.0, the control temperature ($T_C$) and the output supply temperature ($T_S$) rise by approximately one degree for every three degrees drop in the inlet temperature ($T_I$). This relationship is depicted graphically in FIGS. 6 and 7, which show the inlet water temperature ($T_I$) and the control temperature ($T_C$) under two separate scenarios of hot water demand.

Figure 5:
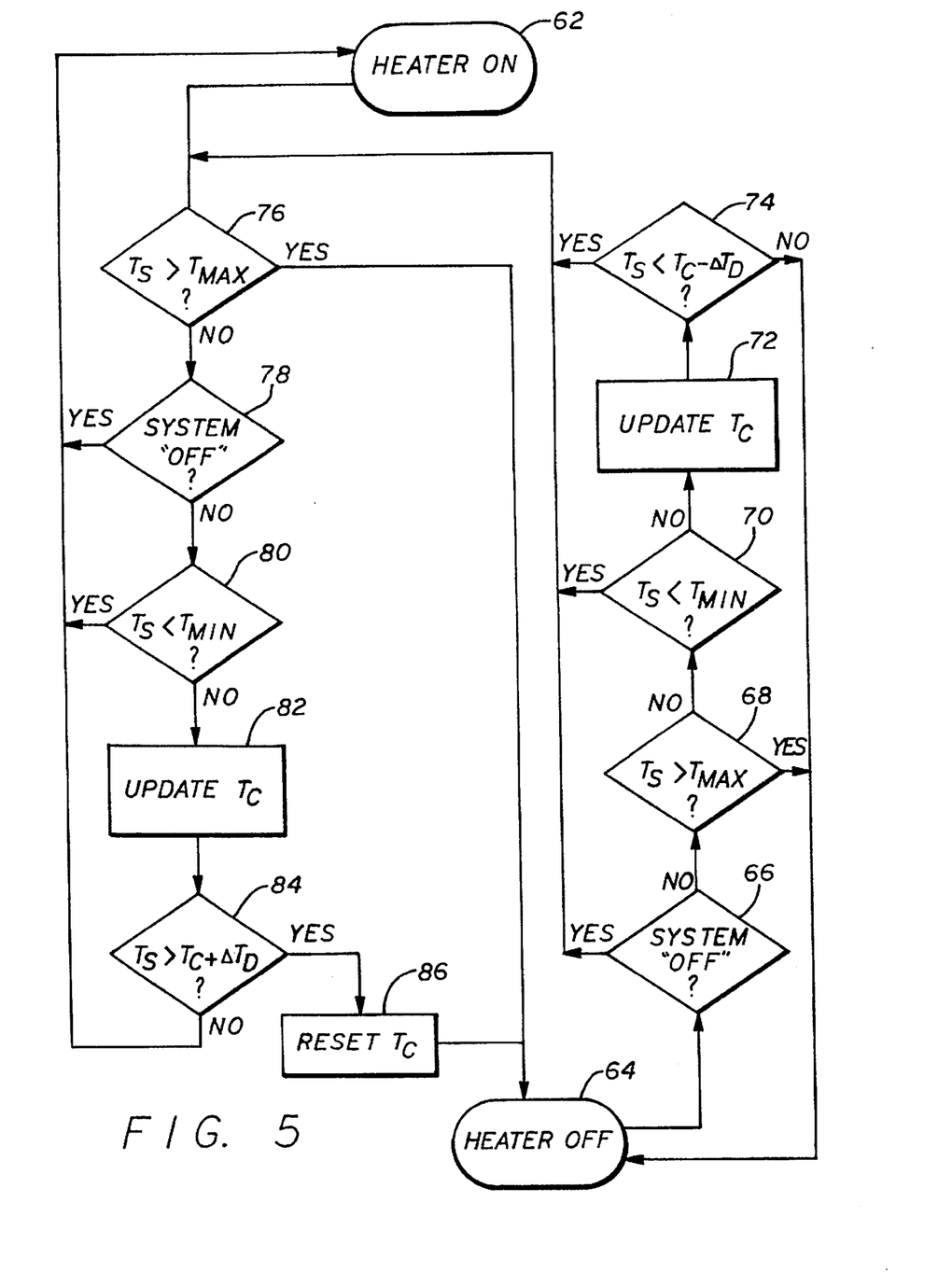
FIG. 5 is a flow chart illustrating a basic method of the operation of the control unit of FIG. 3.

FIG. 5 illustrates the control algorithm of the control unit C in a particular embodiment of the invention, wherein the burners of the water heating system T or I are switched between an "on" state at block 62 and a "off" state at block 64. Beginning when the heater is the "off" condition, the control system C ascertains at block 66 whether or not the usage-based control system is operational. If not, the program flow is diverted to the left hand loop of FIG. 5 to turn the burner of the heater "on". If the usage-based control system is operational, meaning that the system itself is not "off", the control system inquires at block 68 whether $T_S$ is greater than $T_{Max}$. If it is, this means that the output of the water heater is already above the maximum temperature allowable by the control system, and the flow returns to the HEATER OFF block 64. If the supply temperature ($T_S$) is not greater than the maximum allowable temperature ($T_{Max}$), the system inquires at block 70 whether the supply temperature ($T_S$) is less than the minimum allowable supply temperature ($T_{Min}$). If so, program flow is diverted immediately to the left hand loop to turn the heater "on" because the temperature is below the allowable range. If the query at block 70 is answered in the negative, however, the control temperature ($T_C$) is updated at block 72 and the control system inquires at block 74 whether the supply temperature ($T_S$) is less than the control temperature ($T_C$) minus the deadband temperature difference ($\Delta T_D$). If the answer to this latter question is "yes", the program flow is shifted to the left hand loop of FIG. 5 to turn the heater on. If the supply temperature ($T_S$) is equal to or greater than the quantity of block 74, however, it is not necessary to turn the heater "on". In this case, the program flow returns to the HEATER OFF block 64 and the steps of the right hand loop are repeated.

When the control system C reaches the left hand loop of FIG. 5 due to a positive answer at blocks 66, 70 or 74, the flow proceeds down through the steps of the left hand loop. Of these, the first four steps are the same as four of the steps of the right hand loop. Thus, step 76 is the same as step 68, in that it inquires whether the supply temperature ($T_S$) is greater than the maximum temperature allowable by the control system ($T_{Max}$). If the answer is yes, the flow proceeds to the HEATER OFF step of block 64, whereas a negative answer leads to block 78, which asks whether the usage-based control system of the invention has been activated. If it has not, i.e., if the control system is "off", the program flow proceeds immediately to the HEATER ON step of block 62 to turn the burners "on". If the system is activated, however, the flow proceeds to block 80 where the system inquires whether the supply temperature ($T_S$) is less than the minimum allowable temperature ($T_{Min}$). If the relationship of block 80 is true, the flow proceeds immediately to the HEATER ON block 62 to turn the burners "on" and thereby raise the supply temperature ($T_S$). If the supply temperature ($T_S$) is not outside the preset limits, however, the program proceeds to step 82 where the control temperature $_C$) is updated according to equations (8) and (9) above.

The updating of the control temperature ($T_C$) typically occurs every few seconds, and in one embodiment occurs every five seconds, so that the control temperature remains an accurate reflection of not only the magnitude of the temperature drop at the inlet conduit ($T_I$), but also the period over which the temperature drop persists. The control system then compares the supply temperature ($T_S$) to the sum of the updated control temperature ($T_C$) and the deadband temperature ($\Delta T_D$) at step 84. If this relationship is not satisfied, there is a need for further heating of the water. The program flow thus passes upwardly to the HEATER ON block 62 to activate the burners of the water heating system, or keep them activated, as appropriate. If the relationship of block 84 is satisfied, though, the program flow moves instead to reset the value of the control temperature ($T_C$) to the minimum allowable temperature ($T_{Min}$) at block 86 and ultimately turn the heater "off" at block 64. The program then repeats itself in the same manner, constantly updating the control temperature ($T_C$) and switching the burners "on" and "off" to maintain the supply temperature ($T_S$) within a small amount (the "deadband" $\Delta T_D$) of the control temperature ($T_C$). The control temperature ($T_C$) is reset in step 86 each time the burners are turned off as a result of the query of block 84 being satisfied. This can occur either by the supply temperature ($T_S$) increasing or the control temperature ($T_C$) decreasing to a point where heating is no longer necessary. If further usage is detected in subsequent updating cycles, the control temperature ($T_C$) rises rapidly through the frequent recalculation of equations (7) and (9).

Figure 6:
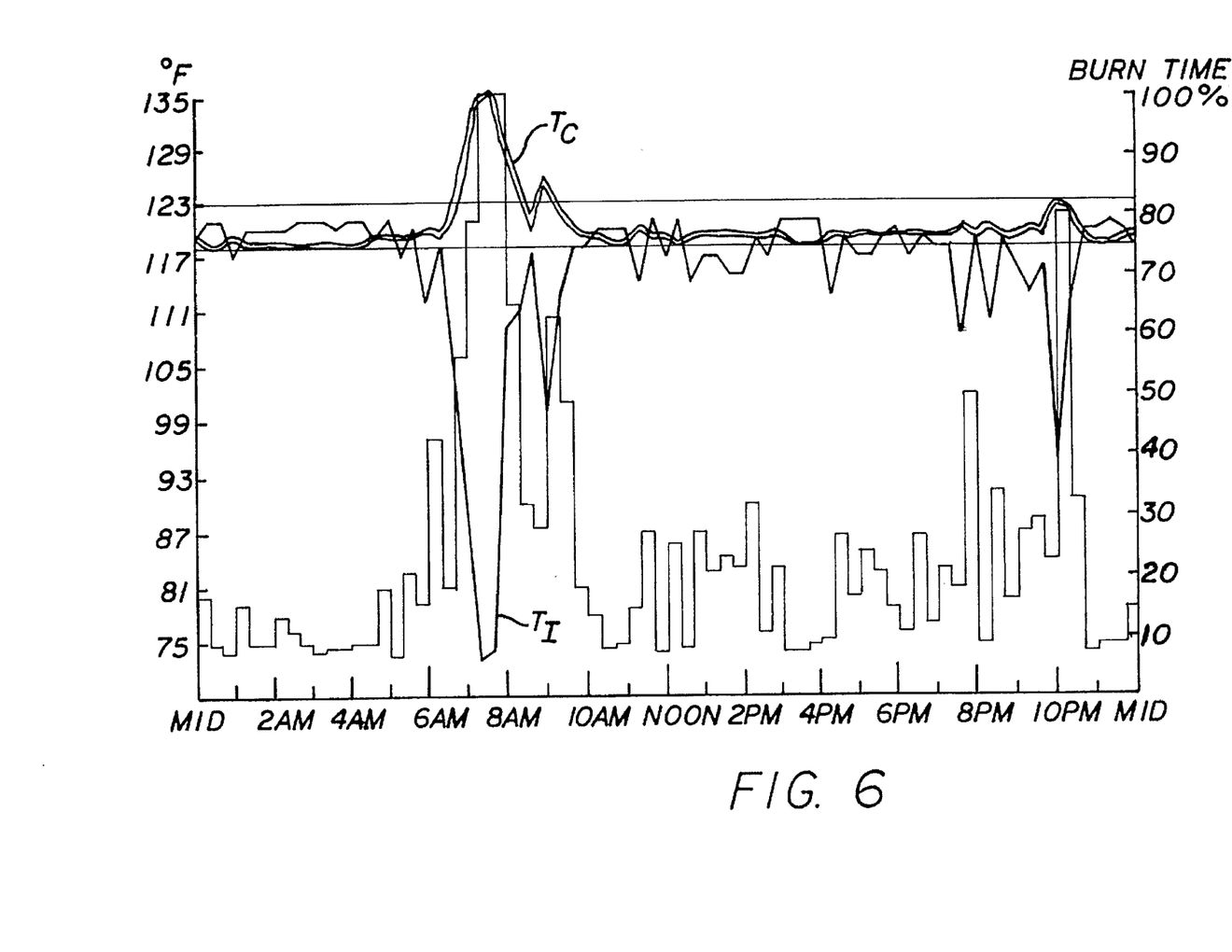
FIG. 6 is a graphical representation of the operation of a control system constructed according to the present invention on a specific day and under specific usage conditions.
Figure 7:
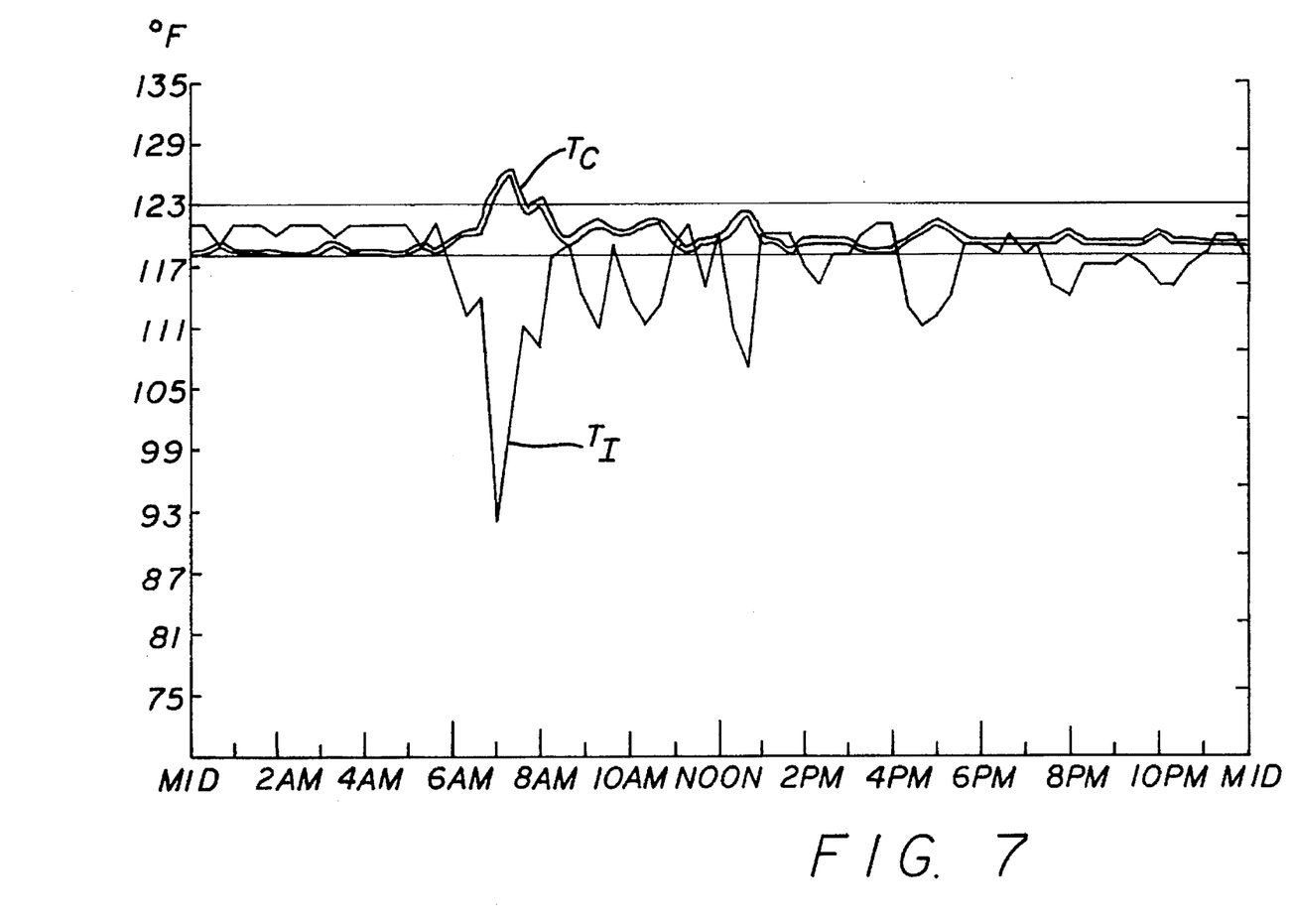
FIG. 7 is a graphical representation of the operation of the control system of FIG. 6 on a different day and under different usage conditions.

FIGS. 6 and 7 represent actual data obtained in a system constructed according to the present invention wherein the value of the ratio "R" is 3.0 per minute, the HEATING term is 12.0 degrees Fahrenheit per minute, the LOSS term is 2.1 degrees Fahrenheit per minute and the deadband ($\Delta T_D$) is 1.0 degree Fahrenheit. In addition, the data is achieved with the maximum temperature ($T_{Max}$) set at 135 degrees, the minimum temperature ($T_{Min}$) set at 118 degrees and the reference temperature ($T_R$) being 123 degrees Fahrenheit. The two graphs represent data obtained on two different days of system operations, with the graph of FIG. 6 representing a response to a much more severe usage scenario. Whereas the inlet water temperature ($T_I$) of FIG. 6 dropped approximately 44 degrees between 6:00 and 7:30 a.m., the inlet temperature of FIG. 7 dropped only approximately 27 degrees. This difference is reflected in the control temperature rising to approximately 134 degrees Fahrenheit at 7:30 a.m. in FIG. 6, and reaching only 126 degrees in the scenario of FIG. 7.

FIG. 6 also shows the percentage of time the burners of the water heater were actually "on" during the scenario depicted. It can be seen that the burners fluctuated between periods when they were "on" only approximately 7 or 8 percent of the time and a period of approximately 45 minutes when they were on 100 percent of the time. The extended periods of low burner usage and low control temperature ($T_C$) represent significant savings in energy usage over conventional aquastats and prior control systems. In addition, the system of the present invention acts rapidly and in a highly controlled manner to provide sufficient hot water to satisfy any usage condition.

From the above, it can be seen that the system and method of the present invention maintains the supply temperature of a water heating system at a value much lower than a conventional aquastat during non-use periods, but acts promptly and in a controlled fashion to fill any encountered demand condition. This saves a substantial amount of energy and extends equipment life without limiting the supply of hot water to consumers.

The appended claims are not limited to the embodiments described herein, but rather are intended to cover all variations and adaptations falling within the true scope and spirit of the present invention.

What is claimed is:

1. A controller for a water heating system having a heater, an outlet conduit for supplying heated water to a plurality of users, and an inlet conduit for introducing unheated water through an inlet orifice to replenish heated water supplied to said users, the controller comprising:

an outlet sensor for measuring an outlet temperature of said heated water and generating an outlet temperature signal representative thereof;

an inlet sensor for measuring an inlet temperature of said unheated water at a location adjacent the inlet orifice such that said inlet temperature drops when unheated water is introduced;

logic responsive to said inlet temperature signal to derive a control temperature value which varies continuously with the amount by which said inlet temperature drops; and control circuitry responsive to said outlet temperature signal for controlling the heater to maintain a preselected relationship between said outlet temperature and said control temperature value.

2. A controller for a water heating system having a heater, an outlet conduit for supplying heated water to a plurality of users, and an inlet conduit for introducing unheated water through an inlet orifice to replenish heated water supplied to said users, the controller comprising:

an outlet sensor for measuring an outlet temperature of said heated water and generating an outlet temperature signal representative thereof;

an inlet sensor for measuring an inlet temperature of said unheated water and generating an outlet temperature signal representative thereof at a location adjacent the inlet orifice and having a reference temperature value when unheated water has not been introduced for a preselected period of time and a dynamic, reduced temperature value when unheated water has been introduced within said preselected period;

logic responsive to said inlet temperature signal to derive a control temperature value representative of the difference between said reference temperature value and said reduced temperature over said preselected period; and control circuitry responsive to said outlet temperature signal for controlling the heater to maintain a preselected relationship between the outlet temperature and said control temperature value.

3. The controller of claim 2 wherein:

said inlet orifice has a preselected diameter; and said inlet sensor is located along said inlet conduit and spaced from said inlet orifice by a distance no more than three times said preselected diameter.

4. The controller of claim 2 wherein:

said logic is constructed and arranged to sample said temperature difference periodically and sum it over time to derive said control temperature value.

5. The controller of claim 4 wherein:

said logic is further constructed and arranged to vary said control temperature value as said summing occurs.

6. The controller of claim 2 wherein:

said reference temperature value is an average of said inlet temperature over time.

7. The controller of claim 2 wherein:

said control circuitry selectively activates and deactivates the heater to maintain said preselected relationship between the outlet temperature and said control temperature value, and to reset said control temperature value to a preselected minimum when the heater is deactivated.

8. A method for controlling a water heating system having a heater, an outlet conduit for supplying heated water to a plurality of users, and an inlet conduit for introducing unheated water through an inlet orifice to replenish heated water supplied to said users, the method comprising the steps of:

measuring an outlet temperature of said heated water and generating an outlet temperature signal representative thereof;

measuring an inlet temperature of said unheated water and generating an inlet temperature signal representative thereof, said inlet temperature being measured at a location adjacent the inlet orifice such that said inlet temperature drops when unheated water is introduced;

deriving, in response to said measured inlet temperature signal, a control temperature value representative of the amount by which said inlet temperature drops; and controlling the heater in response to said outlet temperature signal to maintain a preselected relationship between said outlet temperature and said control temperature value.

9. A method for controlling a water heating system having a heater, an outlet conduit for supplying heated water to a plurality of users, and an inlet conduit for introducing unheated water through an inlet orifice to replenish heated water supplied to said users, the method comprising the steps of:

measuring an outlet temperature of said heated water and generating an outlet temperature signal representative thereof;

measuring an inlet temperature of said unheated water and generating an inlet temperature signal representative thereof, said inlet temperature being measured at a location adjacent the inlet orifice, and having a reference temperature value when unheated water has not been introduced for a preselected period of time and a dynamic, reduced temperature value when unheated water has been introduced within said preselected period;

deriving, in response to said measured inlet temperature signal, a control temperature value representative of the difference between said reference temperature value and said reduced temperature over said preselected period; and controlling the heater in response to said outlet temperature signal to maintain a preselected relationship between the outlet temperature and said control temperature value.

10. The method of claim 9 wherein:

said inlet temperature is sensed at a location along said inlet conduit and spaced upstream of said inlet orifice by a distance no more than three times the diameter of said inlet orifice.

11. The method of claim 9 wherein:

said temperature difference is sampled periodically and summed over time to derive said control temperature value.

12. The method of claim 11 wherein:

said control temperature value varies as said summing occurs.

13. The method of claim 12 which includes the further step of:

correcting said control temperature value as said summing occurs to offset any loss of heat by the water heating system to its surroundings.

14. The method of claim 12 which includes the further step of:

correcting said control temperature value as said summing occurs to account for the heat resulting from operation of said heater.

15. The method of claim 9 wherein:

said reference temperature value is an average of said inlet temperature over time.

16. The method of claim 9 wherein:

the heater is selectively activated and deactivated to maintain said preselected relationship between the outlet temperature and the control temperature value, and said control temperature value is reset to a preselected minimum value when the heater is deactivated.

17. The controller of claim 16 wherein:

said temperature difference is sampled periodically and summed over time to derive said control temperature value; and said control temperature value varies as said summing occurs.

18. The controller of claim 17 wherein:

said inlet temperature is sensed at a location along said inlet conduit and spaced upstream of said inlet orifice by a distance no more than three times the diameter of said inlet orifice; and said reference temperature value is an average of said inlet temperature over time.

* * * * *

UNITED STATES PATENT AND TRADEMARK OFFICE
CERTIFICATE OF CORRECTION

PATENT NO. : 5,626,287
DATED : May 6, 1997
INVENTOR(S) : Timothy D. Krause et al.

It is certified that error appears in the above-indentified patent and that said Letters Patent is hereby corrected as shown below:

Column 4, line 25, delete "wetter" and substitute therefor --water--;

Signed and Sealed this

Fourth Day of November, 1997

Attest:

BRUCE LEHMAN

Attesting Officer      *Commissioner of Patents and Trademarks*